United States Patent
Zanardi et al.

(10) Patent No.: US 8,296,508 B1
(45) Date of Patent: Oct. 23, 2012

(54) SECURE MEMORY DEVICE ERASE

(75) Inventors: Stefano Zanardi, Seriate (IT); Giovanni Guerra, Boscoreale (IT); Domenico Monteleone, Caserta (IT); Angelo Della Monica, Casaluce (IT); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 205 days.

(21) Appl. No.: 12/768,345

(22) Filed: Apr. 27, 2010

(51) Int. Cl.
*G06F 12/00* (2006.01)
*G06F 13/00* (2006.01)
*G06F 13/28* (2006.01)

(52) U.S. Cl. ............... 711/103; 711/154; 711/E12.008

(58) Field of Classification Search ............... None
See application file for complete search history.

(56) References Cited

U.S. PATENT DOCUMENTS

| | | | |
|---|---|---|---|
| 6,961,829 B2 * | 11/2005 | Preishuber-Pfluegl | 711/154 |
| 2006/0266250 A1 * | 11/2006 | Stallo et al. | 104/2 |
| 2007/0150891 A1 * | 6/2007 | Shapiro | 717/174 |
| 2007/0245109 A1 * | 10/2007 | Murillo et al. | 711/163 |
| 2008/0141242 A1 * | 6/2008 | Shapiro | 717/174 |
| 2008/0209106 A1 * | 8/2008 | Bennett et al. | 711/103 |
| 2008/0219057 A1 * | 9/2008 | Li | 365/185.22 |
| 2009/0132760 A1 * | 5/2009 | Flynn et al. | 711/113 |
| 2010/0082885 A1 * | 4/2010 | Litsyn et al. | 711/103 |
| 2010/0082962 A1 * | 4/2010 | Srinivasan et al. | 713/2 |
| 2011/0044102 A1 * | 2/2011 | Dong et al. | 365/185.03 |
| 2011/0283081 A1 * | 11/2011 | Barkley et al. | 711/173 |
| 2011/0289267 A1 * | 11/2011 | Flynn et al. | 711/103 |

* cited by examiner

*Primary Examiner* — Edward Dudek, Jr.
*Assistant Examiner* — Matthew Chrzanowski
(74) *Attorney, Agent, or Firm* — Knobbe, Martens, Olson & Bear LLP (57) ABSTRACT

Subject matter disclosed herein relates to an erasable memory device, and more particularly to a securely erasable flash memory device.

17 Claims, 6 Drawing Sheets

SECURE MEMORY DEVICE ERASE

BACKGROUND

1. Field

Subject matter disclosed herein relates to an erasable memory device, and more particularly to a securely erasable flash memory device.

2. Information

Secrecy and/or privacy issues related to various organizations, such as government, military, financial, or medical organizations, as well as individuals may be addressed, at least in part, by secure management of data. Such data management may involve recording, copying, storing, and/or erasing data, for example. In particular, there may be a desire for ensuring that erased data is no longer retrievable (e.g., readable). However, many erase operations may be made on a computing system that does not necessarily physically erase data from memory. Instead, for example, such an erase operation may merely leave "erased" data in particular memory locations while subsequently allowing new data to be written over the "erased" data. In other words, some erase operations may merely be superficial in that higher level computer operations (e.g., user interface) may merely be modified to appear as though memory is erased, even though it may not be.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Organizations, individuals, and/or other entities that desire relatively secure memory management may implement a secure erase procedure to ensure that secret information stored in a device is difficult or impossible to recover by unauthorized users after memory erasing. For example, unauthorized users may use relatively sophisticated equipment and/or techniques to attempt to retrieve data that is intended to be erased. In one implementation, a secure erase procedure may include executing an erase command to erase data on a portion of memory, writing new, random data in the portion of erased memory, and re-execute an erase command. Unfortunately, such an erase procedure may be slower than desired, involving execution of two erase commands. Another problem associated with such an erase procedure is that endurance of a memory device may be reduced, particular if such a memory device comprises flash memory.

In an embodiment, an improved procedure for securely erasing a memory device may involve implementing memory states that may only be accessed from within the memory device, as explained in detail below. Such states are herein called hidden states. In detail, a memory device may include memory cells capable of storing data using externally accessible program states, such as 1 or 0, high or low, set or reset, and so on. Such states are herein called externally accessible if such states may be read, programmed, and/or erased from outside the memory device. For example, such states may be accessed from a user interface via an external entity, which may comprise a computer processor, a memory controller, a user interface, and/or other entities external to the memory device. On the other hand, a memory device may also be capable of storing data using a hidden state that may not be externally accessible from outside the memory device. For example, such a hidden state may not be accessed by a user interface and/or an external memory controller. Instead, such a hidden state of a memory device may only be implemented from within the memory device. A hidden state may be considered to be an undefined intermediate state that may not be associated with predefined coded states, for example. In a particular embodiment, an internal memory management (IMM) portion of a memory device may implement processes, operations, and/or functions associated with a hidden state, as described in detail below. Of course, such details of hidden states are merely examples, and claimed subject matter is not limited to any particular technique.

In one embodiment, a process managed from within a memory device may program memory cells in various initial states to a hidden state, after which a memory erase operation may occur. Such a process may ensure that previous coded states of the memory cells are difficult or impossible to recover after erasing because the process results in an erase state that comes from a hidden state, which may not contain information useable to recover previous states, as discussed below. Moreover, moving such a secure erase procedure to inside a memory device may increase data security.

Figure 1:
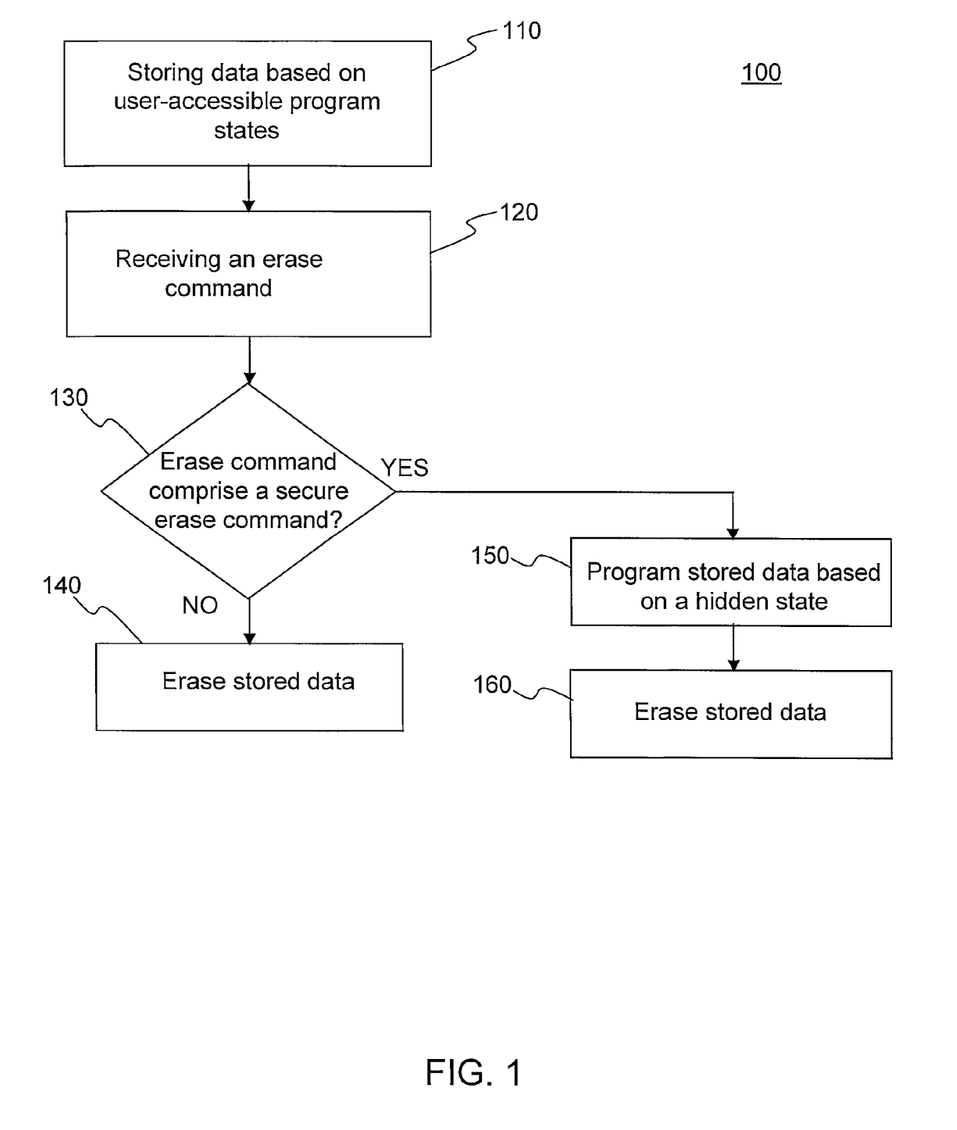
FIG. 1 is a flow diagram of a process to erase memory, according to an embodiment.

FIG. 1 is a flow diagram of a process 100 to erase memory, according to an embodiment. At block 110, a memory device may store data in the form of memory states that are user-accessible. For example, a flash memory device, such as a NAND and/or a NOR flash memory device, may include one or more flash memory cells for use in storing a single bit per cell. Such a bit may include one of either a high logic level or a low logic level. In another implementation, a flash memory device may include one or more multilevel flash memory cells for use in storing multiple bits per cell. Such bits may include one of multiple logic levels. In either such implementation, a memory cell may include a transistor having a floating gate located between a control gate and a channel region of the transistor. A threshold voltage of such a transistor may be programmed or erased by charging or discharging the floating gate. An amount of electrical charge on a floating gate of a transistor may determine which voltage is to be applied to a control gate of the transistor to result in a charge carrier inversion in an underlying channel region. An amount of charge on a floating gate therefore may determine a threshold voltage, and thus a state, of a transistor. Accordingly, data may be written to such memory cells by charging or discharging floating gates of transistors in the memory cells to achieve threshold voltages corresponding to the data. A memory controller to implement write and/or a read operation may be provided to operate such a memory device.

At block 120, a memory device may receive an erase command initiated by a computer processor, for example, and generated by a memory controller, and/or entity external to the memory device. At diamond 130, a determination may be made as to whether an erase command comprises a secure erase command. In one implementation, such a determination may be made externally with respect to the memory device, such as at a portion of a memory controller. In such a case, a particular signal representing either a secure erase command or a non-secure erase command may be provided to the memory device. Herein, a non-secure erase is referred to as a "normal erase." In another implementation, such a determination may be made internally with respect to the memory device, such as at a management portion and/or internal memory controller located within the memory device. In such a case, an erase command received from outside the memory device may be decoded internally to determine whether the received erase command comprises a secure erase command or a normal erase command.

If it is determined that an erase command comprises a normal erase command, then process 100 may proceed to block 140, where data stored in a memory device may be erased. For example, an erase operation may involve raising a voltage of a substrate of memory cells beyond a particular erase voltage for one or more blocks of memory cells while grounding gates of the memory cells. Of course, other techniques for erasing memory cells are possible, and claimed subject matter is not limited to any particular technique.

On the other hand, if it is determined that an erase command comprises a secure erase command, then process 100 may proceed to block 150, where memory locations where data is stored in a memory device may be programmed to be stored based on a hidden state. As mentioned above, such a hidden state may only be accessed from within the memory device while not being externally accessible from outside the memory device. For example, such a hidden state may not be accessed by a user interface and/or an external memory controller. Also, such a hidden state of a memory device may only be implemented from within the memory device. In other words, an operation to program memory locations to a hidden state of a memory device may be generated from only within the memory device. Such a hidden state may be considered to be an undefined intermediate state that may not be associated with predefined coded states, for example.

In an embodiment, a process of programming memory locations storing data in a user-accessible state to a hidden state of a memory cell may eliminate any record and/or trace of previous states. For example, a memory cell may be transitioned to a hidden state by modifying a gate voltage of the memory cell. After a transition to the hidden state, any previous state may not be determined from the memory cell since physical characteristics of the memory cell are changed from such a previous state. In addition, if a transition to a hidden state is implemented only from within a memory device, without external action, then there may be no record and/or trace of such a transition to the hidden state outside the memory device. Thus, such a transition to a hidden state may destroy previously stored data, which may be the intention of a secure erase, for example. However, to complete such a secure erase procedure, process 100 may proceed to block 160, where data stored in a hidden state in the memory device may be erased and/or reset. At this stage of process 100, such an erase may be initiated from within the memory device without action of an external memory controller outside the memory device, for example. An erase operation may involve raising a voltage of a substrate of memory cells beyond a particular erase voltage for one or more blocks of memory cells while grounding gates of the memory cells. Of course, as mentioned above, other techniques for erasing memory cells are possible, and claimed subject matter is not limited to any particular technique.

Figure 2:
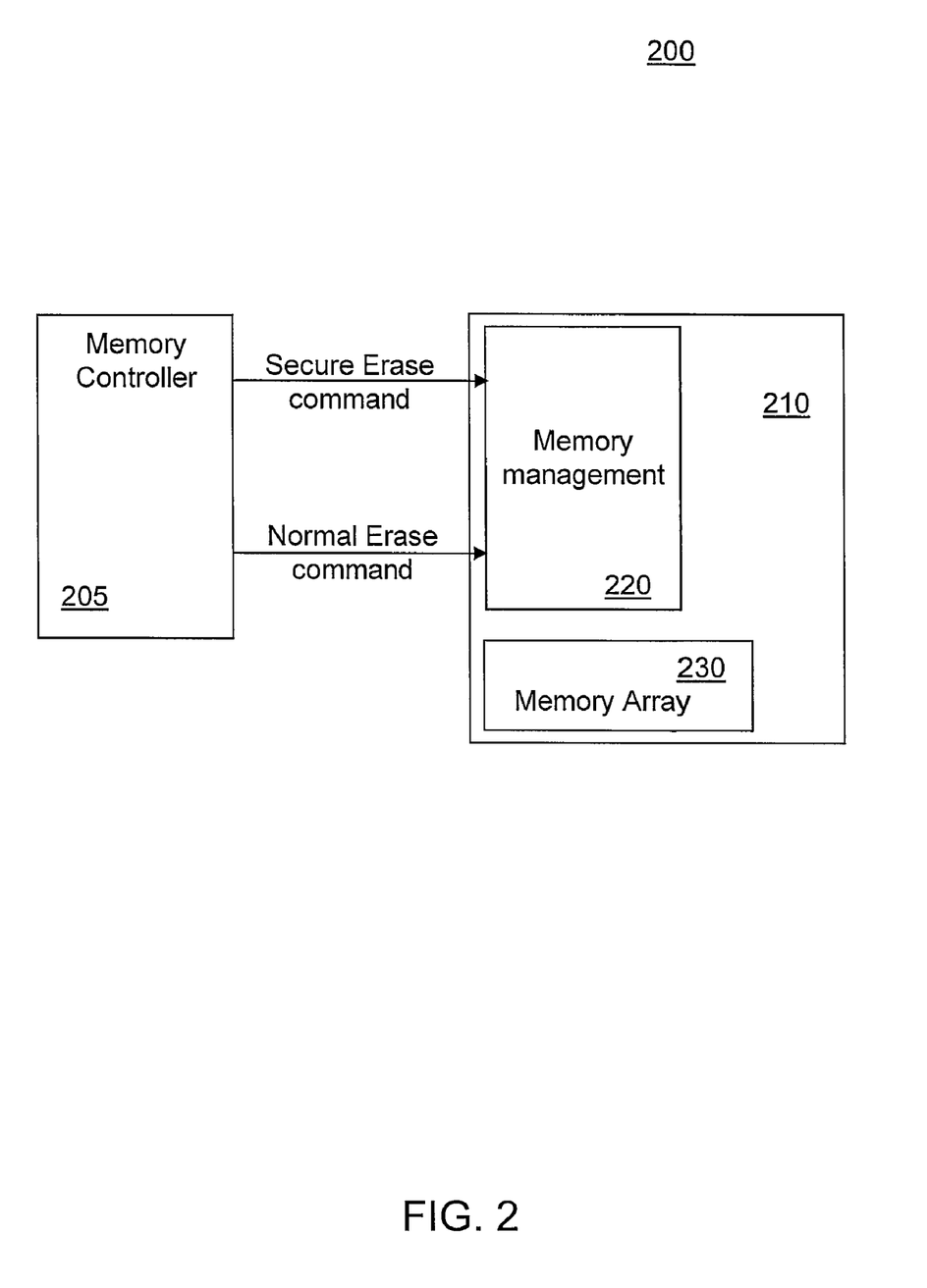
FIG. 2 is a schematic diagram of a memory system, according to an embodiment.

FIG. 2 is a schematic diagram of a memory system 200, according to an embodiment. A memory controller 205, which may be responsive to a user interface and/or a computer processor for example, may generate an erase command directed to a memory device 210. Such an erase command may comprise a secure erase command or a normal erase command. A secure erase command may have a setup/confirm command different than that of a normal erase command, for example. In one particular implementation, however, such a memory controller may merely generate a normal erase command. In such a case, a memory device 210 may treat such a normal erase command as a secure erase command.

Memory device 210 may include a memory array 230 and an internal memory management (IMM) 220 comprising a portion of memory device 210. IMM 220 may implement processes, operations, and/or functions associated with one or more hidden states. For example, a particular program-verify process associated with a hidden state in memory array 230 may be implemented by IMM 220. In detail, such a program-verify process may involve program voltage levels that are higher than program voltage levels associated with externally-accessible states. Also, IMM 220 may implement particular sense amplifier and/or voltage pump parameters associated with one or more hidden states. Additionally, IMM 220 may maintain and/or implement executable code in order to carry out memory operations associated with one or more hidden states. In one implementation, IMM 220 may receive an erase command from outside memory device 210, such as from memory controller 205 for example. Upon receiving an erase command, IMM 220 may determine whether the erase command comprises a secure erase command or a normal erase command. Upon such a determination, IMM 220 may implement, for example, portions of process 100 comprising block 150 and/or block 160, as described above. Of course, such details of memory system 200 are merely examples of possible configurations, and claimed subject matter is not so limited.

Figure 3:
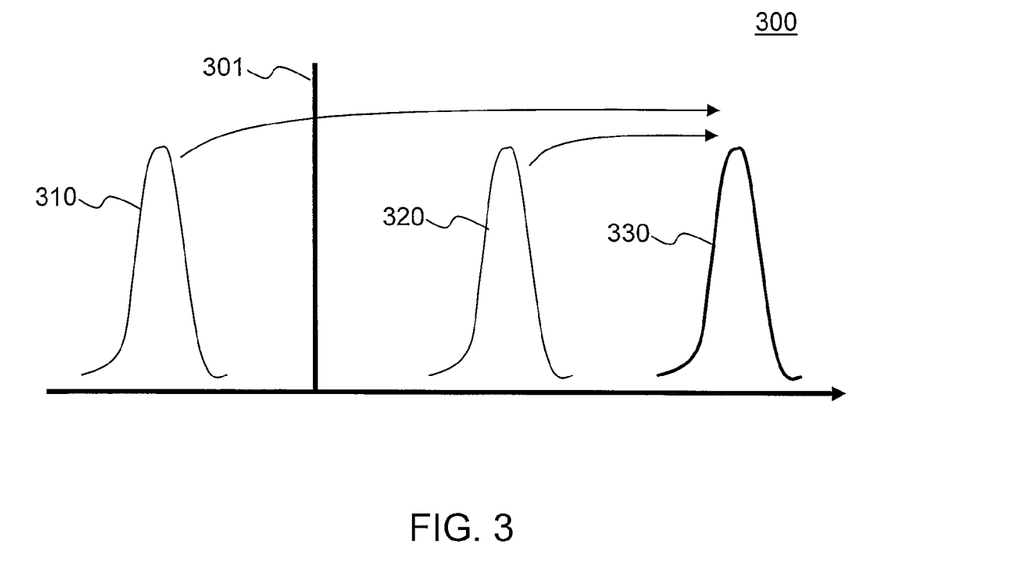
FIGS. 3-8 are state diagrams of memory devices, according to an embodiment.

FIGS. 3-8 are state diagrams of memory devices, according to an embodiment. A horizontal axis represents a relative voltage associated with a memory state while line 301 represents a division between erased states left of line 301 and programmed states right of line 301. Of course, positions and/or scales of such an axis are merely examples, and claimed subject matter is not limited in this respect. For example, FIG. 3 is a state diagram 300 showing an erased or reset state 310, a programmed or set state 320, and a hidden state 330, according to an embodiment. As explained above, such states of a memory cell may be defined by an amount of voltage placed on a gate of the memory cell.

Figure 4:
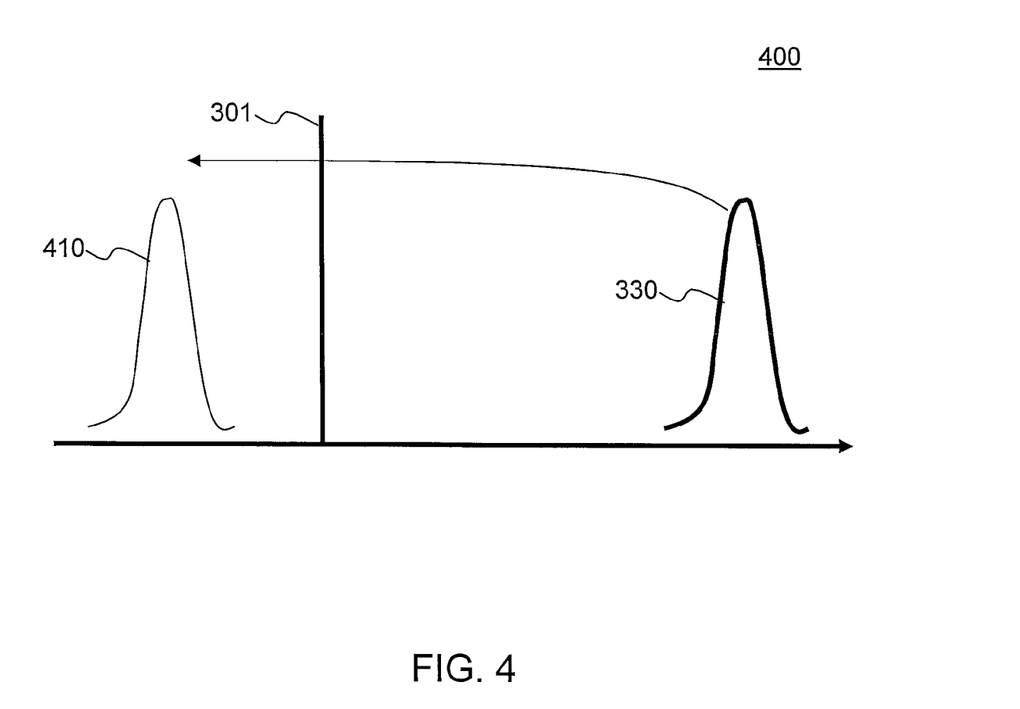

Continuing with the example shown in FIG. 3, one or more memory cells in a memory device may be in a reset state 310 and/or a set state 320. In such a condition, a memory device may store data that may be written over, read, and/or erased, for example. Upon receiving a secure erase command, a secure erase process, such as process 100, may be carried out. As at block 150 described above, memory locations storing data in a memory device may be programmed based on a hidden state. Accordingly, both set state 320 and reset state 310 may transition to hidden state 330, as indicated by arrows in FIG. 3. As discussed above, such programming to hidden state 330 may be implemented from within a memory device. Next, as described above for block 160, data stored in hidden state 330 may be erased and/or reset to state 410, as shown in FIG. 4. Again, such an erase and/or reset process may be initiated from within the memory device without action of an external memory controller outside the memory device, for example.

Figure 5:
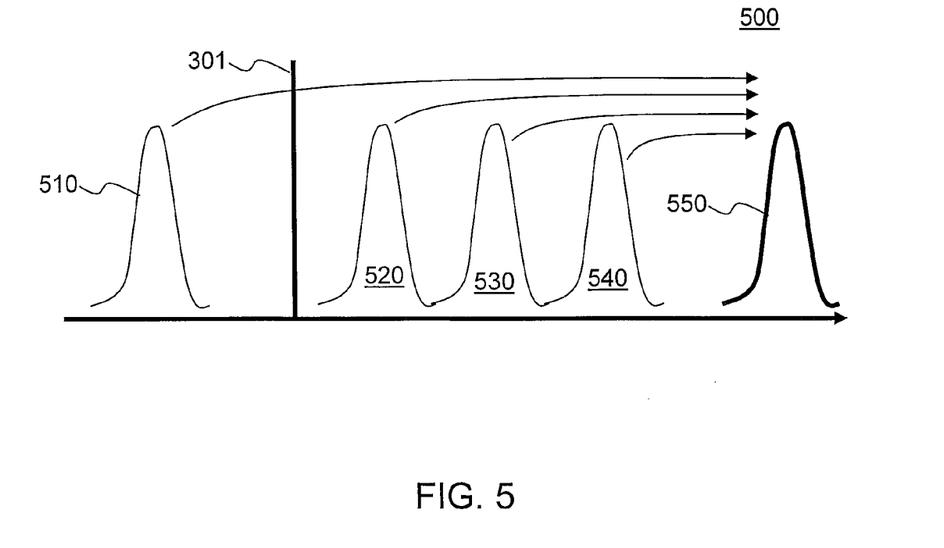
Figure 6:
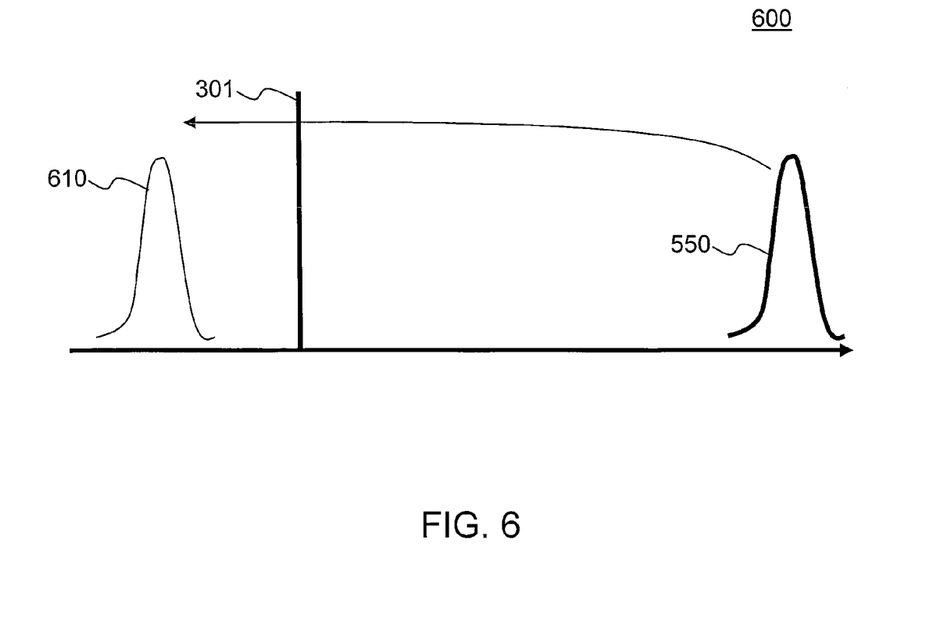

FIG. 5 is a state diagram 500 of a multi-level memory device showing an erased or reset state 510, programmed or set states 520, 530, 540, and a hidden state 550, according to an embodiment. Such states of a multi-level memory cell may be defined by an amount of voltage placed on a gate of the memory cell. In such a case, reset state 510 and programmed or set states 520, 530, 540 may be externally accessible while hidden state 550 may only be accessed and/or implemented from within the memory device, as discussed above. Upon receiving a secure erase command, a secure erase process, such as process 100, may be carried out. As at block 150 described above, memory locations storing data in a memory device may be programmed based on a hidden state. Accordingly, set states 520, 530, and 540 and reset state 510 may transition to hidden state 550, as indicated by arrows in FIG. 5. Again, such programming to hidden state 550 may be implemented from within a memory device. Next, as described above for block 160, data stored in hidden state 550 may be erased and/or reset to state 610, as shown in FIG. 6. Again, such an erase and/or reset process may be initiated from within the memory device without action of an external memory controller outside the memory device, for example. Of course, such details of hidden states and state transitions are merely examples, and claimed subject matter is not so limited.

Figure 7:
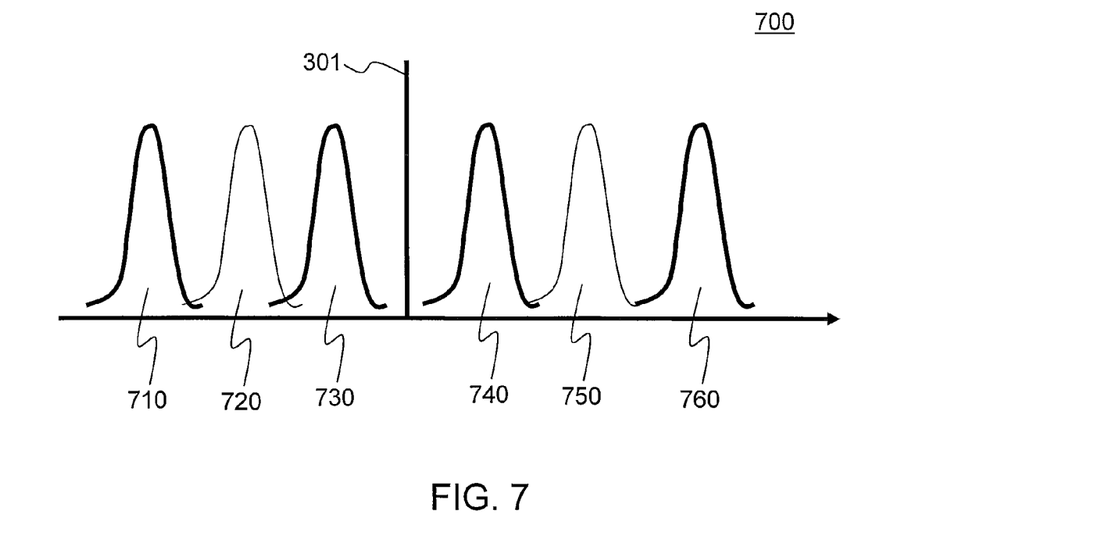

FIG. 7 is a state diagram 700 of a single-level memory device showing an erased or reset state 720 and a programmed or set state 750, according to an embodiment. Such states of a single-level memory cell may be defined by an amount of voltage placed on a gate of the memory cell. In a particular implementation, one or more hidden states may be internally implemented. For example, hidden states 710, 730, 740, and 750 may comprise hidden states that are not externally accessed. Such hidden states may be distributed across a relatively wide range of state voltages. For example, hidden states 710 and 730 may involve state voltages relatively close to that of reset state 720. Similarly, hidden states 740 and 760 may involve state voltages relatively close to that of set state 750.

Figure 8:
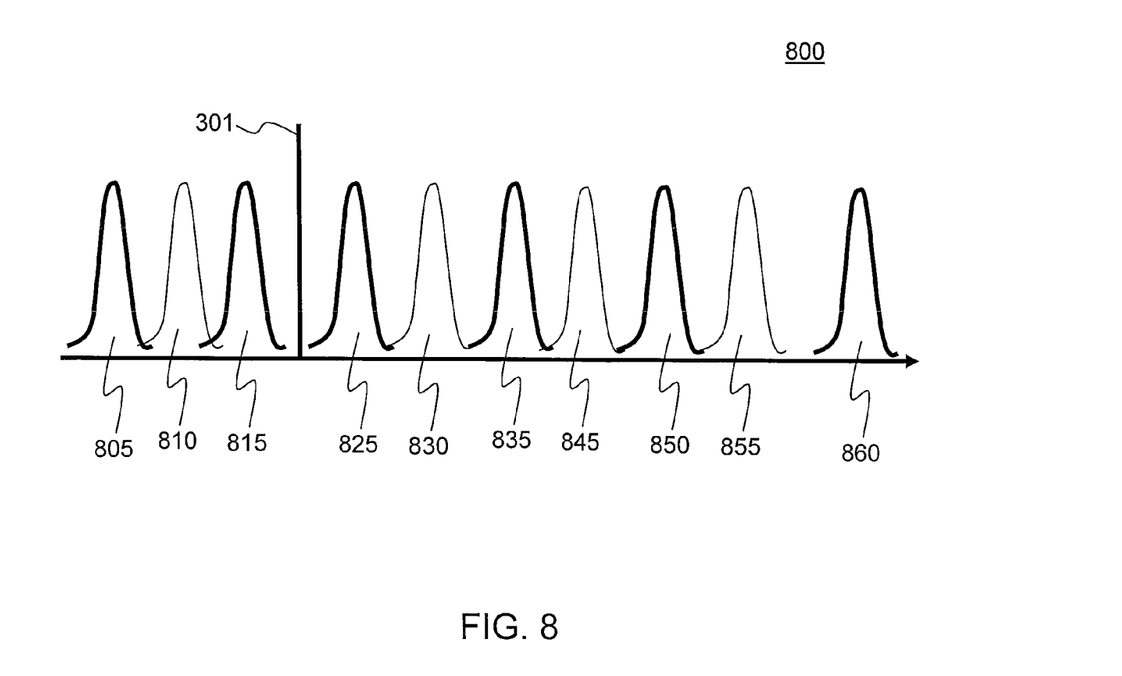

FIG. 8 is a state diagram 800 of a multi-level memory device showing an erased or reset state 810 and programmed or set states 830, 845, and 855, according to an embodiment. Such states of a multi-level memory cell may be defined by an amount of voltage placed on a gate of the memory cell. In a particular implementation, one or more hidden states may be internally implemented. For example, hidden states 805, 815, 825, 835, 850, and 860 may comprise hidden states that may not be externally accessed. Such hidden states may be distributed across a relatively wide range of state voltages. For example, hidden states 805 and 815 may involve state voltages relatively close to that of reset state 810. Similarly, hidden states 825, 835, and 850 may involve state voltages relatively close to that of set states 830, 845, and 855.

Figure 9:
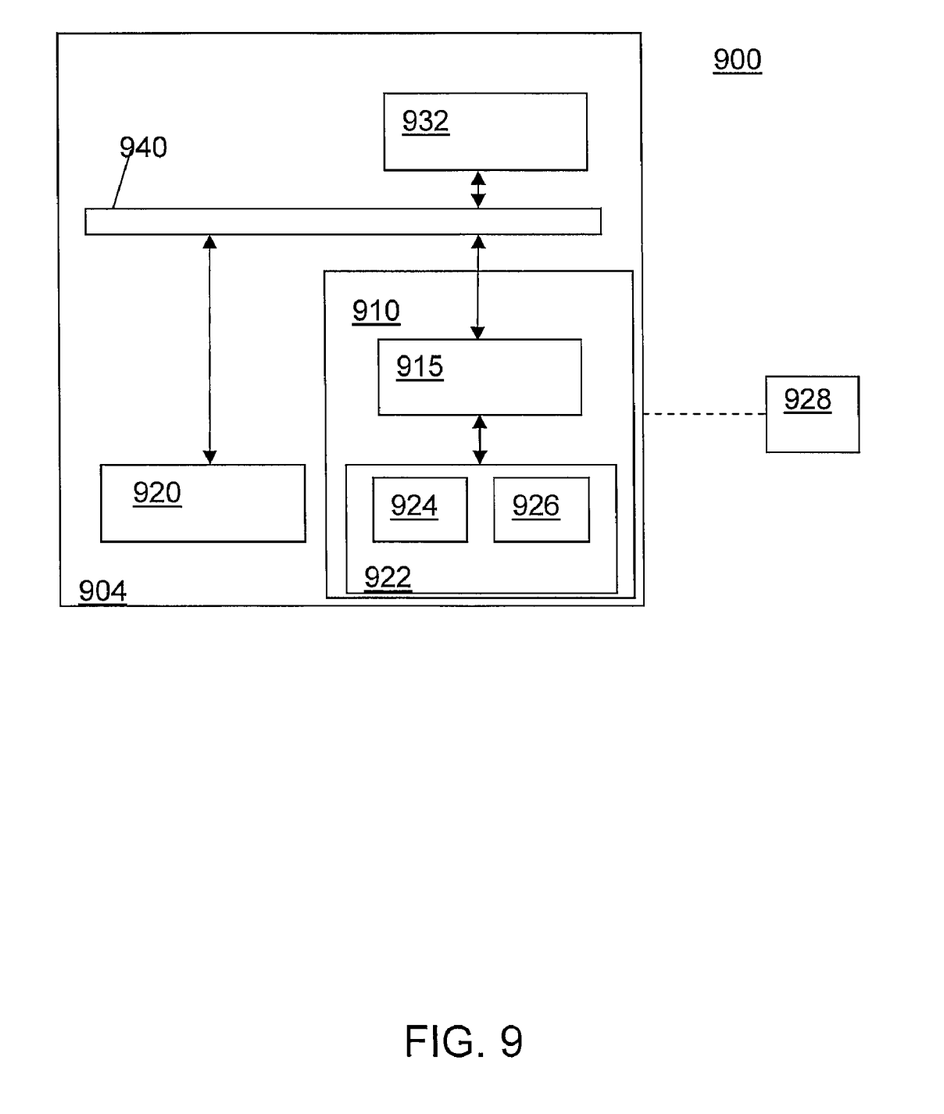
FIG. 9 is a schematic view of a computing system and a memory device, according to an embodiment.

FIG. 9 is a schematic diagram illustrating an exemplary embodiment of a computing system 900 including a memory device 910. Such a computing device may comprise one or more processors, for example, to execute an application and/or other code. For example, memory device 910 may comprise a memory array 230 shown in FIG. 1. A computing device 904 may be representative of any device, appliance, or machine that may be configurable to manage memory device 910. Memory device 910 may include a memory controller 915 and a memory 922. By way of example but not limitation, computing device 904 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 900, and the processes and methods as further described herein, may be implemented using or otherwise including hardware, firmware, software, or any combination thereof. Thus, by way of example but not limitation, computing device 904 may include at least one processing unit 920 that is operatively coupled to memory 922 through a bus 940 and a host or memory controller 915. Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof. Processing unit 920 may include an operating system configured to communicate with memory controller 915. Such an operating system may, for example, generate commands to be sent to memory controller 915 over bus 940. Such commands may comprise read and/or write commands. In response to a write command, for example, memory controller 915 may provide a bias signal, such as a set or reset pulse to write information associated with the write command to a memory partition, for example. In another example, memory controller 915 may provide erase commands to a memory device that includes an IMM portion to store data in the memory device using two or more program states that are accessible by the memory controller. Such an IMM may also program memory locations storing data in a hidden state that is defined internally to the memory device in response to receiving an erase command from the memory controller.

Memory 922 is representative of any data storage mechanism. Memory 922 may include, for example, a primary memory 924 and/or a secondary memory 926, each of which may be partitioned into one or more partitions as discussed above, for example. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory and/or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 928. Computer-readable medium 928 may include, for example, any medium that can carry and/or make accessible data, code, and/or instructions for one or more of the devices in system 900.

Computing device 904 may include, for example, an input/output 932. Input/output 932 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 932 may include an operatively configured display, speaker, keyboard, mouse, trackball, touch screen, data port, etc.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    storing data in locations of a memory device using two or more program states corresponding to threshold voltages, said program states being accessible from entities external to said memory device;
    programming said locations to one or more intermediate states corresponding to voltages other than said threshold voltages, wherein said one or more intermediate states are defined internally to said memory device in response to receiving an erase command, wherein said one or more intermediate states are not readable from and not writable from an entity external to said memory device; and
    erasing said locations programmed to said one or more intermediate states.

2. The method of claim 1, further comprising:
    performing a program-verify process for programming said locations in said one or more intermediate states.

3. The method of claim 2, further comprising:
    determining whether said erase command comprises a secure erase command or a normal erase command; and
    modifying said program-verify process based at least in part on said determination.

4. The method of claim 1, wherein said two or more program states are readable and writable from an entity external to said memory device.

5. The method of claim 1, wherein said programming said locations in said one or more intermediate states comprises adding electrical charge to floating gates of one or more memory cells in said memory device.

6. A memory device comprising:
    a plurality of memory cells;
    an interface to receive an erase command from an entity external to said memory device, wherein said external entity defines threshold voltages of said memory cells as corresponding to program states; and
    circuitry internal to said memory device, said circuitry to program said one or more memory cells to one or more intermediate states corresponding to voltages other than said threshold voltages and to subsequently erase said programmed one or more memory locations in response to receiving said erase command, wherein said one or more intermediate states are defined internally to said memory device, wherein said one or more intermediate states are not readable from and not writable from an entity external to said memory device.

7. The memory device of claim 6, further comprising:
    an internal memory management (IMM) portion to provide a program-verify process to program said memory locations to said state one or more intermediate states.

8. The memory device of claim 7, wherein said IMM portion is capable of modifying said program-verify process based, at least in part, on whether said erase command comprises a secure erase command or a normal erase command.

9. The memory device of claim 6, wherein said circuitry is further adapted to program said memory locations to two or more program states that are readable and/or writable from said entity external to said memory device.

10. The memory device of claim 6, wherein said one or more intermediate states are associated with a particular amount of electrical charge on floating gates of memory cells located at least at one of said memory locations in said memory device.

11. The memory device of claim 10, wherein said memory cells comprise NAND memory cells.

12. A system comprising:
    a memory controller,
    a memory device; and
    an internal memory management (IMM) portion to:
        store data in locations of said memory device using two or more program states corresponding to threshold voltages, said program states being accessible from entities external to said memory device; and
    program said locations to one or more intermediate states corresponding to voltages other than said threshold voltages defined internally to said memory device in response to receiving an erase command from said memory controller, wherein said one or more intermediate states are not readable from and not writable from an entity external to said memory device;
        erase said locations programmed to said one or more intermediate states; and
    a processor to host one or more applications and to initiate commands to said memory controller to provide access to said memory device.

13. The system of claim 12, wherein said entities external to said memory device comprise said memory controller.

14. The system of claim 12, wherein said IMM portion is further adapted to perform a program-verify process for programming said stored data in said one or more intermediate states.

15. The system of claim 14, wherein said IMM portion is further adapted to:
    determine whether said erase command comprises a secure erase command or a normal erase command; and
    modify said program-verify process based on said determination.

16. The system of claim 12, wherein said two or more program states are readable and/or writable external to said memory device.

17. The system of claim 12, wherein said memory device comprises a NAND memory device.

\* \* \* \* \*